US010532391B2

(12) United States Patent
Haselboeck et al.

(10) Patent No.: US 10,532,391 B2
(45) Date of Patent: Jan. 14, 2020

(54) BENDING TOOL STORAGE DEVICE

(71) Applicant: TRUMPF Maschinen Austria GmbH & Co. KG., Pasching (AT)

(72) Inventors: Alfred Haselboeck, Rohrbach (AT); Matteo Tiraferri, San Gillio (IT); Andrea Tonda Roch, Turin (IT); Giovanni Vidotto, Chieri (IT)

(73) Assignee: TRUMPF Maschinen Austria GmbH & Co. KG, Pasching (AT)

( * ) Notice: Subject to any disclaimer, the term of this patent is extended or adjusted under 35 U.S.C. 154(b) by 122 days.

(21) Appl. No.: 15/742,685

(22) PCT Filed: Jul. 7, 2016

(86) PCT No.: PCT/AT2016/050244
§ 371 (c)(1),
(2) Date: Feb. 5, 2018

(87) PCT Pub. No.: WO2017/004648
PCT Pub. Date: Jan. 12, 2017

(65) Prior Publication Data
US 2018/0193896 A1     Jul. 12, 2018

(30) Foreign Application Priority Data

Jul. 8, 2015  (AT) .................................. 50599/2015

(51) Int. Cl.
*B21D 37/04*     (2006.01)
*B21D 37/14*     (2006.01)
(Continued)

(52) U.S. Cl.
CPC ......... *B21D 37/145* (2013.01); *B21D 5/0254* (2013.01); *B23Q 3/1572* (2013.01);
(Continued)

(58) Field of Classification Search
CPC ......... Y10T 483/1729; Y10T 483/1731; Y10T 483/1845; Y10T 483/1855;
(Continued)

(56) References Cited

U.S. PATENT DOCUMENTS 2,956,454 A * 10/1960 Hansen ............. B23Q 3/15706
 408/13
3,966,052 A * 6/1976 Knaus ............... B23Q 3/15526
 211/70.6
(Continued)

FOREIGN PATENT DOCUMENTS

CH        668 035 A5    11/1988
DE      2 031 442 A1    12/1971
(Continued)

OTHER PUBLICATIONS

International Search Report of PCT/AT2016/050244, dated Oct. 24, 2016.

*Primary Examiner* — Sunil K Singh
*Assistant Examiner* — Yasir A Diab
(74) *Attorney, Agent, or Firm* — Collard & Roe, P.C.

(57) ABSTRACT

The invention relates to a bending tool storage device (1) for storing bending tools (2), comprising at least one storage unit (3), which comprises an outer tool storage (4) which is ring-shaped or partial-ring-shaped and has a plurality of guide rails (14) for holding and guiding bending tools (2), characterized in that the storage unit (3) comprises at least one inner tool storage (5, 6) which is arranged inside the outer tool storage (4) and has a plurality of guide rails (15, 16) for holding and guiding bending tools (2), and in that the outer tool storage (4) and the inner tool storage (5, 6) are rotatable relative to one another, wherein, in different positions of relative rotation between outer tool storage (4) and inner tool storage (5), at least one guide rail (14) of the outer tool storage (4) is in each case in aligned orientation with another guide rail (15, 16) of the inner tool storage (5, 6).

30 Claims, 8 Drawing Sheets

(51) Int. Cl.
   *B21D 5/02* (2006.01)
   *B65G 1/04* (2006.01)
   *B23Q 3/157* (2006.01)
   *B23Q 3/155* (2006.01)
(52) U.S. Cl.
   CPC ......... *B23Q 3/15506* (2013.01); *B65G 1/045* (2013.01); *Y10T 483/1731* (2015.01); *Y10T 483/1855* (2015.01); *Y10T 483/1882* (2015.01)
(58) Field of Classification Search
   CPC ........ Y10T 483/1873; Y10T 483/1882; B21D 5/0254; B21D 37/147; B30B 15/028
   USPC .......................................... 72/446, 447, 448
   See application file for complete search history.

(56) References Cited

U.S. PATENT DOCUMENTS

| | | | | |
|---|---|---|---|---|
| 4,218,816 A | * | 8/1980 | Dormehl | B23B 29/242 414/730 |
| 4,587,716 A | | 5/1986 | Bytow | |
| 5,281,194 A | * | 1/1994 | Schneider | B23Q 3/15526 211/1.52 |
| 5,702,336 A | * | 12/1997 | Kameyama | B23Q 3/1554 294/106 |
| 6,656,099 B1 | * | 12/2003 | Akami | B21D 5/02 483/29 |
| 6,814,692 B2 | | 11/2004 | Mattes et al. | |
| 7,153,252 B2 | | 12/2006 | Luescher | |
| 10,058,962 B2 | * | 8/2018 | Cai | B23Q 3/15526 |
| 10,166,639 B2 | * | 1/2019 | Jung | B23Q 3/15526 |
| 2011/0015050 A1 | * | 1/2011 | Hakamata | B23Q 3/15526 483/67 |

FOREIGN PATENT DOCUMENTS

| | | |
|---|---|---|
| DE | 33 20 762 A1 | 12/1984 |
| DE | 10 2004 028151 A1 | 12/2005 |
| DE | 10 2013 013978 A1 | 2/2015 |
| DE | 10 2014 104786 A1 | 10/2015 |
| EP | 1 364 742 A1 | 11/2003 |
| EP | 2 143 506 B1 | 1/2010 |
| GB | 1 348 306 A | 3/1974 |
| JP | S61-219431 A | 9/1986 |

\* cited by examiner

BENDING TOOL STORAGE DEVICE

CROSS REFERENCE TO RELATED APPLICATIONS

This application is the National Stage of PCT/AT2016/050244 filed on Jul. 7, 2016, which claims priority under 35 U.S.C. § 119 of Austrian Application No. A 50599/2015 filed on Jul. 8, 2015, the disclosure of which is incorporated by reference. The international application under PCT article 21(2) was not published in English.

The invention relates to a bending tool storage device for storing bending tools, comprising at least one storage unit, which comprises an outer tool storage which is ring-shaped or partial-ring-shaped and has a plurality of guide rails for holding and guiding bending tools. The invention also relates to a loading device, in particular a changing device, for loading a bending press with bending tools and/or for changing one or more bending tools inserted in a bending press, and to a method for depositing at least one bending tool in a storage device and/or for taking at least one bending tool from a storage device.

CH668035A5 discloses a bending press and a mechanism for changing bending tools. Here, bending tools are suspended in a storage device, in each case from a hook. Changing is carried out by means of—a carrier arm which is rotatable about a horizontal swivel axis and which picks up a single bending tool and transfers it from the tool storage to the bending press. A disadvantage of this changing device is that a large amount of space must be provided for the movement of the carrier arm. Furthermore, the approach and swiveling of the arm towards the bending press tool holder requires a complex sequence of movements. In addition, there is a high risk of collision between carrier arm and parts of the bending press on the one hand and the tool storage on the other. A great deal of time is also required for the changeover as the bending tools can only be transferred individually, i.e., successively.

EP2143506B1 discloses a device for changing and fitting a multi-part tool for a trimming press. A complex and space-consuming transfer device with a gripper or hook removes bending tools from the tool storage and transports them to the bending press. The transfer device can be moved vertically and horizontally for this purpose; the hook can also be rotated.

Further storage devices known from the prior art have the disadvantage that their storage capacity is only very small. That is to say, the number of bending tools which can be deposited in the storage device per unit of space is limited and collisions between individual bending tools cannot be ruled out.

The disadvantages resulting from the prior art therefore consist on the one hand in the elaborate and space-consuming form of the tool storage and of the transfer device which transfers the bending tools from the tool storage to the bending press. On the other hand, the storage capacity of the tool storages is highly limited, and such a tool storage requires a large amount of space. In particular, this results in that a special holding structure, e.g., in the form of a hook, is required for each tool (as in CH668035A5), or the tool storage must have sufficient (intermediate) space for the entry of the transfer device (as in the two publications mentioned above). Changing tools is sometimes very time-consuming. As well as an increased risk of collision of the moving parts including the bending tools and the transfer device, the cost outlay is also a disadvantageous factor of the known devices.

The object of the invention consists in eliminating or mitigating these disadvantages and providing a bending tool storage device and/or loading device which can be sized in a more space-saving manner and the tool storages of which have a higher storage density, i.e., can accommodate a greater number of bending tools per unit of space. It must be possible to carry out the loading and changing of bending tools in a simple and reliable manner. The risk of collisions is to be reduced, preferably eliminated entirely. The bending tool storage device and loading device and the operation thereof must be more costeffective.

This objective is achieved with a storage device of the kind mentioned in the introduction in that the storage unit comprises at least one inner tool storage which is arranged inside the outer tool storage and has a plurality of guide rails for holding and guiding bending tools, and in that the outer tool storage and the inner tool storage are rotatable relative to one another, wherein, in different positions of relative rotation between outer tool storage and inner tool storage, at least one guide rail of the outer tool storage is in each case in aligned orientation with another guide rail of the inner tool storage.

By providing at least one inner tool storage, on the one hand the storage capacity of the storage device is increased, and, on the other, the depositing and extraction of individual bending tools in or from the tool storages is simplified. The counter-rotation of the tool storages enables complex shunting operations, during which the bending tools are moved along the guide rails.

The guide rails of the outer tool storage as well as the guide rails of the inner tool storage are in each case separated from one another by angular distances; the guide rails run in a direction from the inside to the outside in each case.

In the case of a ring-shaped or partial-ring-shaped tool storage, the guide rails run from the inner circumference towards the outer circumference of the tool storage. In the case of a disc-shaped (inner) tool storage, they run from an inner region towards the outer circumference. The directions in which the guide rails run therefore have a radial component in each case.

In an embodiment, the guide rails of the outer tool storage and the guide rails of the at least one inner tool storage in each case run in a radial direction (here the running direction of the guide rails has no tangential component) or in a direction with radial component.

In an alternative embodiment, the guide rails of the outer tool storage and the guide rails of the at least one inner tool storage each run in directions with tangential component. In this embodiment too, the guide rails run from the inside to the outside but are inclined to the (purely) radial direction. The length of the individual guide rails can be increased by this measure. In this embodiment, the running directions of the guide rails have a tangential component in addition to a radial component. The radial and tangential direction component is in each case referred to the ring, partial ring or disc shape (or the center) of the respective tool storage.

The radial direction or the radial direction component of the guide rails refers in each case to the center, which is defined by the ring shape, partial-ring shape or disc shape (or circular shape) of a tool storage. Due to the individual guide rails in each case running in the radial direction or in a direction with radial component, the distance between adjacent guide rails of a tool storage increases in the radial direction (i.e., from the inner circumference towards the outer circumference). That is to say, adjacent guide rails have an angular distance from one another (and are not parallel to one another).

The outer tool storage and the at least one inner tool storage are located in a common plane (or can be moved into a common plane), thus enabling a bending tool to be moved from one tool storage to another tool storage.

With the storage device according to the invention, it is also possible to accommodate a plurality of bending tools in one guide rail successively in a row, as a result of which the storage density of the tool storage is further increased. Now, in order to be able to extract or separate a first bending tool from this row, bending tools can be moved temporarily into the respective other tool storage and stored (temporarily) there. Furthermore, the two counter-rotatable tool storages enable bending tools to be moved from one (or a first) guide rail of the tool storage to another (or second) guide rail of the same tool storage. Such shunting operations take place exclusively by means of moving operations of bending tools along guide rails and relative rotation(s) between the tool storages.

An advantage of the invention consists in that, during the shunting maneuver, the bending tools remain continuously located in guide rails (i.e., do not have to be removed from the guide rails). The transfer of a bending tool from one guide rail (e.g., of the outer tool storage) to another guide rail (e.g., of the inner tool storage) takes place in that the two guide rails are in aligned orientation with one another (as a result of which a continuous guide section is produced), and by moving the bending tool from one guide rail into the other guide rail. Intermediate steps, which comprise the removal of a bending tool from a guide rail and its replacement, are unnecessary as result of the principle according to the invention.

In order to effect a relative movement (rotation) between outer and inner tool storage, it is possible to make the outer tool storage and/or the inner tool storage rotatable. As a result of the relative rotation, the guide rail(s) of the one tool storage can be brought in aligned orientation with different guide rails of the other tool storage.

As a result of the measure according to the invention, on the one hand, the loading process can be accelerated and made more efficient and, on the other, the possible storage density of bending tools in the storage device is increased.

A preferred embodiment is characterized in that the at least one inner tool storage is ring-shaped or partial ring-shaped. As a result, it is matched to the shape of the outer tool storage and, by rotating, can bring different guide rails into common alignment with one another. Such arrangements also increase the storage density.

The outer tool storage and/or the inner tool storage can in each case form a closed ring (ring-shaped) or a ring which is open at one side (partial-ring-shaped). With regard to the storage density, ring-shaped tool storages (closed ring) are preferred, but partial-ring-shaped tool storages can also be used for other reasons (e.g., space conditions). The inner tool storage could also be formed in the shape of a disc instead of a ring shape.

A preferred embodiment is characterized in that the at least one inner tool storage is arranged concentrically with respect to the outer tool storage. Here, the centers which are defined by the ring shape, partial ring shape or disc shape of the tool storages coincide. As well as a space-saving arrangement, this also enables an increase in the storage density. It is also possible to have the tool storage rotate about a common axis of rotation.

A preferred embodiment is characterized in that the inside diameter of the outer tool storage corresponds substantially to the outside diameter of the inner tool storage. Here, at most, a small gap is provided between the tool storages so that the bending tools can move directly from one tool storage to the other.

An embodiment is characterized in that the width of the tool storages is different. As a result, shorter bending tools can preferably be stored in the less wide tool storage and longer bending tools in the wider tool storage. The 'width' is understood to mean the (radial) extension of a tool storage between its outer circumference and its inner circumference.

A preferred embodiment is characterized in that the outer tool storage and the inner tool storage each form a closed ring and that the number of guide rails of the outer tool storage is greater, preferably by at least 1.3 times greater, particularly preferably by at least 1.5 times greater, than the number of guide rails of the inner tool storage. As a result of this measure, the space available is used in the best possible way and more bending tools can be deposited (in the outer tool storage). In doing so, use is made of the fact that the extension of the outer tool storage in the circumferential direction is greater than the extension of the inner tool storage in the circumferential direction. For the same or similar lateral distance from adjacent guide rails, more guide rails can be accommodated on the outer tool storage.

A preferred embodiment is characterized in that the angular distance between adjacent guide rails of the outer tool storage is less than the angular distance between adjacent guide rails of the inner tool storage. The angular distance is understood to mean that angle by which adjacent guide rails are inclined with respect to one another. As a result of this measure the storage capacity can be considerably increased.

Preferably, in the outer tool storage, the angular distances between adjacent guide rails are in each case no greater than a first angle and, in the inner tool storage, the angular distances between adjacent guide rails are in each case at least as great as a second angle, wherein the second angle is greater than the first angle. As a result of this measure, the storage density can likewise be increased.

The second angle can particularly be at least 1.3 times, preferably at least 1.5 times, particularly preferably at least 2 times as great as the first angle.

A preferred embodiment is characterized in that shorter bending tools are held in the guide rails of the outer tool storage than in the guide rails of the inner tool storage. As a result of such a distribution, the space available can be optimally utilized. The inner tool storage is designed to accommodate larger bending tools, wherein, as a result of appropriate distances between the guide rails, it is guaranteed that no collisions occur between bending tools. The shorter bending tools are preferably held on the outer tool storage in a position which lies closer to the outer circumference than to the inner circumference of the outer tool storage. As a result—with at the same time high storage density—collisions are also avoided, as the distance between adjacent guide rails is greater in the region of the outer circumference than in the region of the inner circumference of the outer tool storage.

A preferred embodiment is characterized in that the outer tool storage and the at least one inner tool storage are rotatable, preferably about a common axis of rotation. As both tool storages are rotatable in themselves (in particular relative to a frame on which both tool storages are mounted), the options for shunting operations are increased, as a result of which the loading process can be simplified and shortened.

Preferably, the outer tool storage and the inner tool storage of the storage unit each have their own rotary drive. This enables a rotation of the tool storages simultaneously and independently of one another.

In an alternative embodiment, at least two tool storages of the storage unit have a common rotary drive, from which they can be individually decoupled. In this embodiment, at least one rotary drive can be saved. An actuatable coupling provides for the coupling and decoupling of the tool storages from the rotary drive.

A preferred embodiment is characterized in that the storage unit comprises at least one sensor, in particular an angle sensor, for determining the rotational position of the outer tool storage and/or the at least one inner tool storage. This enables an automation of the storage and loading operations.

A preferred embodiment is characterized in that a transfer device for moving the bending tools along the guide rails is arranged inside the inner tool storage.

A preferred embodiment is characterized in that the storage unit comprises at least two inner tool storages which are rotatable relative to one another. As a result, the storage capacity can be further increased. The further inner tool storage(s) also have guide rails running from the inside to the outside, which can be brought in aligned orientation with guide rails of the adjacent tool storage by means of relative rotation. A storage unit can also have a plurality of (partial-) ring-shaped tool storages arranged concentrically.

The object is also achieved with a storage device for storing bending tools, comprising at least one storage unit, which comprises at least one tool storage which is ring-shaped or partial ring-shaped and has a plurality of guide rails (e.g., running in a radial direction or in a direction with tangential component) for holding and guiding bending tools, in particular according to one of the preceding embodiments, wherein the at least one tool storage has along its circumference a first section in which the angular distance between adjacent guide rails is less than in a second section along its circumference. As a result of this measure, the storage density can be increased in that more guide rails per unit angle are arranged and, accordingly, also more bending tools can be accommodated, in the second section. At the same time, adjacent guide rails of the second section can be separated from one another such that (short) bending tools can be deposited next to one another (i.e., in adjacent guide rails) in the region of the outer circumference without touching one another. On the other hand, in the region of the inner circumference, the lateral distance between adjacent guide rails is already so small that collisions occur if two bending tools are moved through this region simultaneously. However, the advantage of being able to accommodate more bending tools in guide rails next to one another predominates.

A preferred embodiment is characterized in that, in the first section, the angular distances between adjacent guide rails are in each case no greater than a first angle and that, in the second section, the angular distances between adjacent guide rails are in each case at least as great as a second angle, wherein the second angle is greater than the first angle. As a result of this measure, an increase in storage density is achieved. More guide rails per unit angle (than in the second section) are arranged and, accordingly, also more bending tools can be accommodated, in the first section. Above all, as a result of the solution according to the invention, the fact that bending tools have different size and shape can be taken into account. The first section can therefore be specifically used to accommodate shorter and/or narrower bending tools. On the other hand, longer and/or wider bending tools can be accommodated in the second section. With appropriate storage strategy, the achievable storage density, that is to say the number of bending tools per unit of space, can be increased as a result.

At this point, it must be mentioned that the bending tool storage can also have two or more first and/or second sections which alternate, e.g., along the circumference of the bending tool storage.

A preferred embodiment is characterized in that, in the first section, the angular distances between adjacent guide rails are in each case as great as the first angle and/or that, in the second section, the angular distances between adjacent guide rails are in each case as great as the second angle. As a result, an arrangement of equidistant (i.e., having the same angular distance from one another) guide rails can be achieved in the first and/or second section.

A preferred embodiment is characterized in that the second angle is at least 1.3 times, preferably at least 1.5 times, particularly preferably at least 2 times as great as the first angle. The packing density in the first section, that is to say the number of bending tools to be stored per unit of space, can therefore be increased by the corresponding factor.

A preferred embodiment is characterized in that shorter bending tools are held in the guide rails of the first section than in the guide rails of the second section. The arrangement of longer bending tools in adjacent guide rails of the first section does not lead to any problems, as the angular distance between the guide rails here is greater anyway.

A preferred embodiment is characterized in that the at least one first section and/or the at least one second section extend over an angular range of at least 30°, preferably at least 60°, particularly preferably at least 90°. As a result, a substantial increase in storage density can be achieved.

A preferred embodiment is characterized in that the first section and/or the second section comprise at least 3, preferably at least 5, particularly preferably at least 10 guide rails.

A preferred embodiment is characterized in that shorter bending tools are held in guide rails of the first section than in guide rails of the second section, wherein the bending tools are arranged closer to the outer ends—referred to the radial direction—of the guide rails than to the inner ends, preferably in the region of the outer ends of the guide rails.

Such a storage strategy takes into account the size and shape of the bending tools, as a result of which the achievable storage density is increased.

A preferred embodiment is characterized in that, in the first section, the distance between the longitudinal axes of adjacent guide rails in the region of their inner ends—referred to the radial direction—is no greater than, preferably less than the dimension of a bending tool held in a guide rail of the first section perpendicular to the direction of the guide rail. As a result, the available space is optimally utilized in that the guide rails are arranged as close as possible to one another.

A preferred embodiment is characterized in that the storage device has at least two storage units which are arranged above one another and preferably concentrically with one another. As a result, a bending tool reservoir with large storage capacity can be created.

A preferred embodiment is characterized in that the guide rails of a first storage unit and the guide rails of a second storage unit face one another. The first storage unit therefore constitutes a lower tool storage and the second storage unit an upper tool storage. Upper tool storage and lower tool storage are preferably (and corresponding to the arrangement of tool holdings in a bending press) arranged above one another.

A preferred embodiment is characterized in that the storage device comprises at least one intermediate store which has at least one guide rail for holding and guiding bending tools, wherein the intermediate store can be moved between the storage units. As a result, a bending press can be loaded with bending tools from different storage units.

The object is also achieved with a loading device, in particular a changing device, for loading a bending press with bending tools and/or for changing one or more bending tools inserted in a bending press, comprising a storage device according to the invention. The loading device can comprise a transfer device for moving bending tools along guide rails.

A preferred embodiment is characterized in that the transfer device comprises a shuttle—in particular in the form of a slide or carriage—which can be moved along the guide rail(s) and is preferably guided in the guide rail.

A preferred embodiment is characterized in that the transfer device comprises an elongated, preferably flexible tension and/or compression transmission means, in particular a belt, a rope, a rod or a chain, and that the shuttle is connected to the tension and/or compression transmission means. By using a tension and/or compression transmission means, the traverse drive of the transfer device can be arranged remotely from the guide rails.

The transfer device can therefore also be designed with low weight and in a space-saving manner. The transmission means can be designed for transmitting tensile forces or compression forces or tensile and compression forces. A tension and compression means is used when the loading and changing of bending tools is carried out from one end of the rail only.

The transfer device, in particular the shuttle, preferably has a releasable coupling for attaching a bending tool. As a result, the transfer device can not only push but also pull the bending tools. The coupling has a releasing (released) position and a coupling position and can be operated by an actuator. The coupling can be designed as a mechanical coupling, magnetic coupling or as a suction device for example. The coupling can produce a frictional and/or interlocking connection with the bending tool. The actuator for operating the coupling can comprise a cylinder-piston unit, a linear drive, a motor, a vacuum device and/or an electromagnetic device.

In an alternative variant, the shuttle could also be designed to be self-propelled, wherein the traverse drive is arranged in or on the shuttle. In this way, the transfer device can be designed particularly economically with regard to the number of components. The shuttle could be controlled by wire connection or also wirelessly.

The objective is also achieved with an arrangement of a bending press and a loading device coupled thereto according to the present invention for loading the bending press with bending tools, wherein the bending press has a tool holder for holding and guiding bending tools designed as a guide rail. Bending press and loading device can form a continuous guide section so that a bending tool can be transferred from or into the bending press merely by moving along guide rails.

The object is also achieved with a method for depositing at least one bending tool in a storage device and/or for taking at least one bending tool from a storage device according to the invention, wherein the at least one bending tool is moved along guide rails of the tool storages.

A preferred embodiment is characterized in that the method comprises at least one shunting operation in which at least one bending tool is moved from a guide rail of the one tool storage into a guide rail of the other tool storage, and in which the outer tool storage and the inner tool storage are rotated relative to one another. The loading or depositing process can be greatly simplified as a result.

A preferred embodiment is characterized in that shorter bending tools are deposited in the guide rails of the outer tool storage than in the guide rails of the inner tool storage. As already explained above, the number of bending tools to be accommodated can be increased by appropriate distribution of shorter and longer bending tools.

A preferred embodiment is characterized in that shorter bending tools are deposited in the guide rails of the first section than in the guide rails of the second section. Here, the tool storage has along its circumference a first section in which the angular distance between adjacent guide rails is less than in a second section along its circumference.

In a further embodiment, at least one guide rail of the outer tool storage and at least one guide rail of the inner tool storage are used as a transition guide (i.e., not for storing tools). When these two guide rails are in aligned orientation, the transfer device can carry out the transfer operation of a bending tool from or out of the bending press by moving it through the transition guide.

For better understanding of the invention, it is described in more detail with reference to the following figures.

In the drawings, in each case in greatly simplified schematic form.

By way of introduction, it should be noted that identical parts in the different embodiments described are assigned the same references or the same component designations, wherein the disclosures contained in the overall description can be conferred analogously on identical parts with the same references or same component designations. The positional information chosen in the description, such as for example top, bottom, side etc., relates to the figure directly described and shown, and in the event of a positional change, this positional information is to be conferred analogously on the new position.

The exemplary embodiments show possible design variants of the storage device, wherein at this point it should be noted that the invention is not restricted to the specially shown design variants thereof, but rather various combinations of the individual design variants with one another are also possible and, based on the teaching relating to the technical activity due to the present invention, this variation option lies within the ability of the person skilled in the art in this technical field.

Furthermore, individual characteristics or combinations of characteristics from the different exemplary embodiments shown and described can also constitute independent, inventive solutions or solutions according to the invention in their own right.

The object on which the independent inventive solutions are based can be seen from the description.

Above all, the individual embodiments shown in the figures can form the subject matter of independent solutions according to the invention. The related objects and solutions according to the invention can be found in the detailed descriptions of these figures.

Finally, as a matter of form, it should be pointed out that, for better understanding of the design of the storage device and other constituent parts of the invention, these or their constituent parts have to some extent been shown not-to-scale and/or enlarged and/or reduced.

Figure 1:
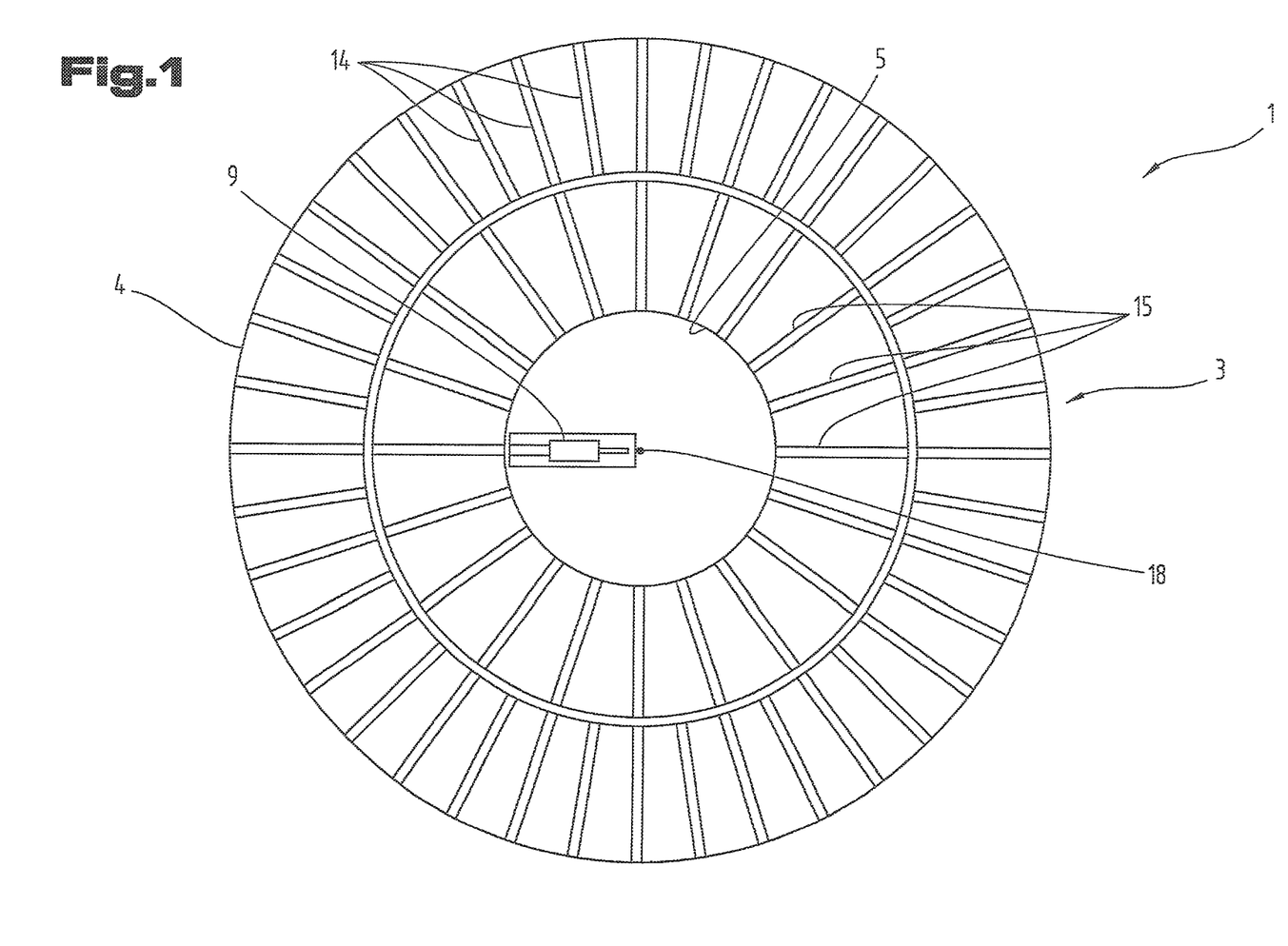
FIG. 1 shows a storage device according to the invention.

FIG. 1 shows a bending tool storage device 1 for storing bending tools 2. A storage unit 3 of the storage device 1 comprises an outer tool storage 4, which is ring-shaped (alternatively: partial-ring-shaped) and has a plurality of guide rails 14 running in a radial direction for holding and guiding bending tools 2.

The storage unit 3 comprises an inner tool storage 5, which is arranged inside the outer tool storage 4 and likewise has a plurality of guide rails 15 running in a radial direction for holding and guiding bending tools 2. The outer tool storage 4 and the inner tool storage 5 are rotatable relative to one another, wherein, in different positions of relative rotation between outer tool storage 4 and inner tool storage 5, at least one guide rail 14 of the outer tool storage 4 is in each case in aligned orientation with another guide rail 15 of the inner tool storage 5.

The inner tool storage 5 is likewise ring-shaped (alternatively: partial ring-shaped). The tool storages 4, 5 are arranged concentrically with one another and are rotatable about a common axis of rotation 18.

A transfer device 9 for moving the bending tools 2 along the guide rails 14, 15 is arranged inside the inner tool storage 5. The transfer device (which is shown in detail in FIG. 6) can comprise a shuttle 22—in particular in the form of a slide or carriage—which can be moved along the guide rail(s) and is preferably guided in the guide rail.

Figure 6:
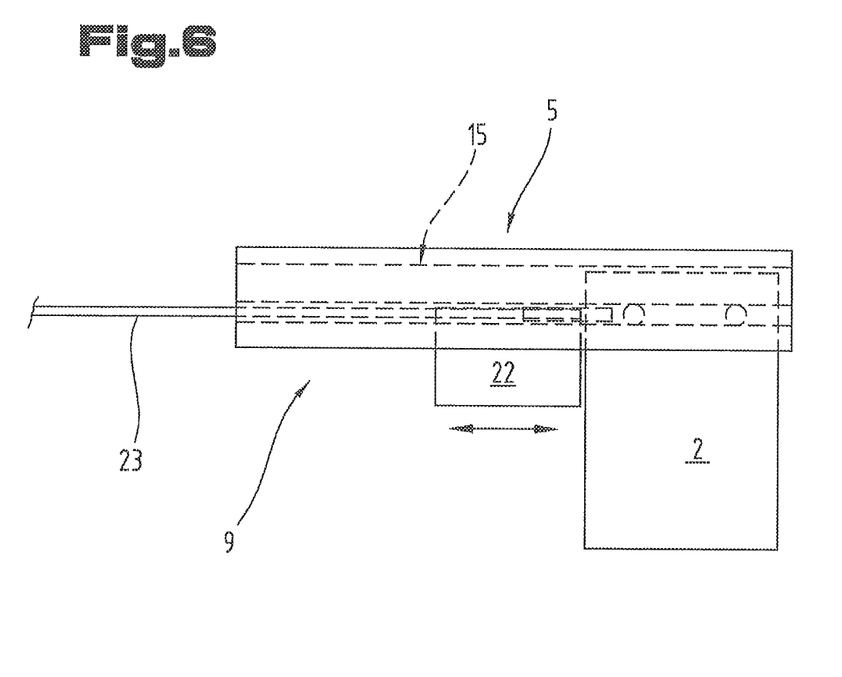
FIG. 6 shows a transfer device with tool storage.

Likewise, the transfer device 9 can comprise an elongated, preferably flexible tension and/or compression transmission means 23, in particular a belt, a rope, a rod or a chain. The shuttle 22 is connected to the tension and/or compression transmission means 23. The transfer device 9, in particular the shuttle 22, preferably has a releasable coupling for attaching a bending tool 2. As a result, the transfer device can not only push but also pull the bending tools.

The inside diameter of the outer tool storage 4 corresponds substantially to the outside diameter of the inner tool storage. As can be seen from the preferred embodiment of FIG. 1, the outer tool storage 4 and the inner tool storage 5 in each case form a closed ring.

The number of guide rails 14 of the outer tool storage 4 is greater than (here: double) the number of guide rails 15 of the inner tool storage 5.

Figure 2:
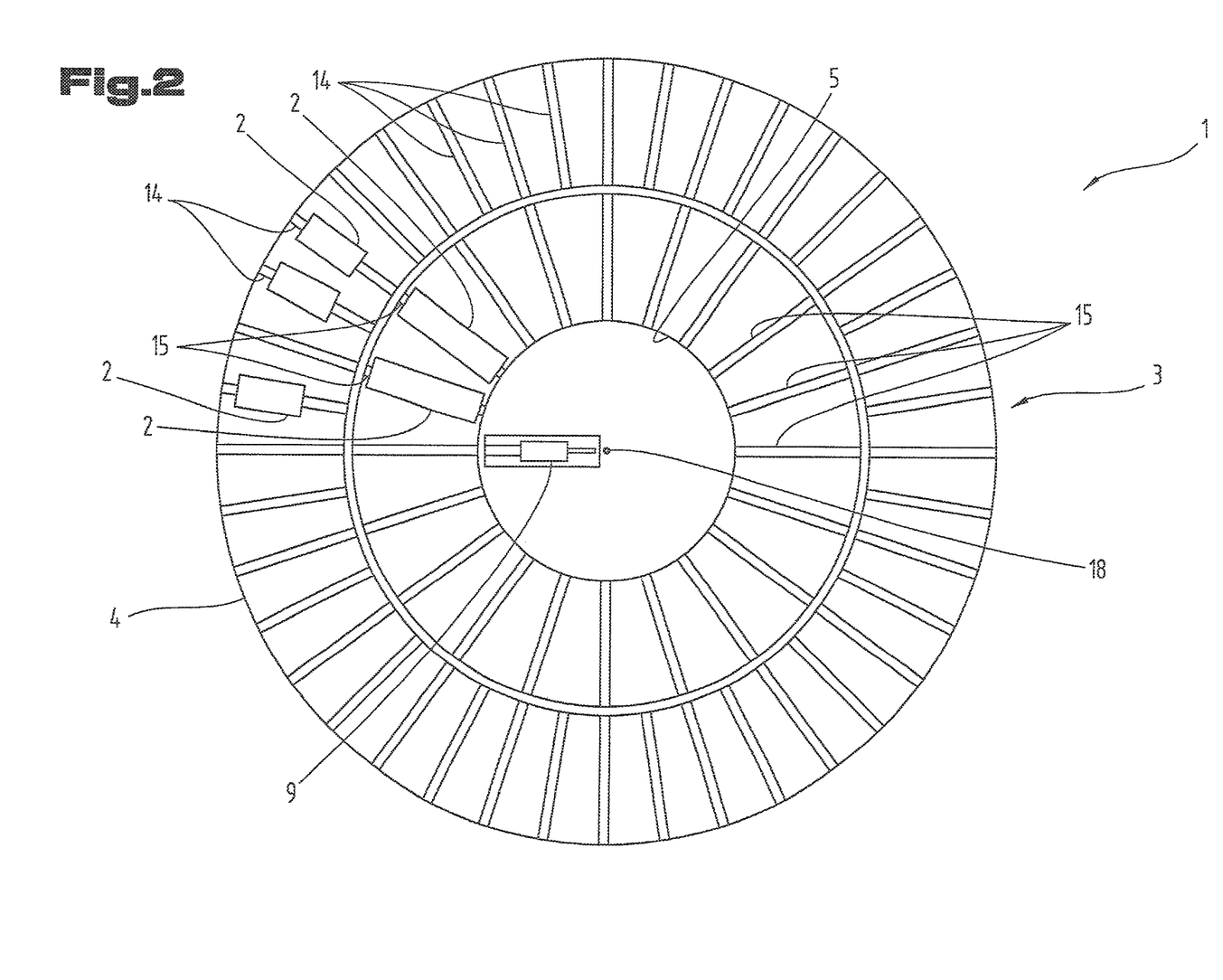
FIG. 2 shows the storage device from FIG. 1 with deposited bending tools.

As a result, the angular distance between adjacent guide rails 14 of the outer tool storage 4 is less (here: 9°) than the angular distance between adjacent guide rails 15 of the inner tool storage 5 (here: 18°). FIGS. 1 and 2 are, of course, to be understood as illustrative examples and every possible distribution of radially running guide rails or guide rails having a radial direction component is possible.

FIG. 2 shows an application in which shorter bending tools 2 are held in the guide rails 14 of the outer tool storage 4 than in the guide rails 15 of the inner tool storage 5.

Figure 3:
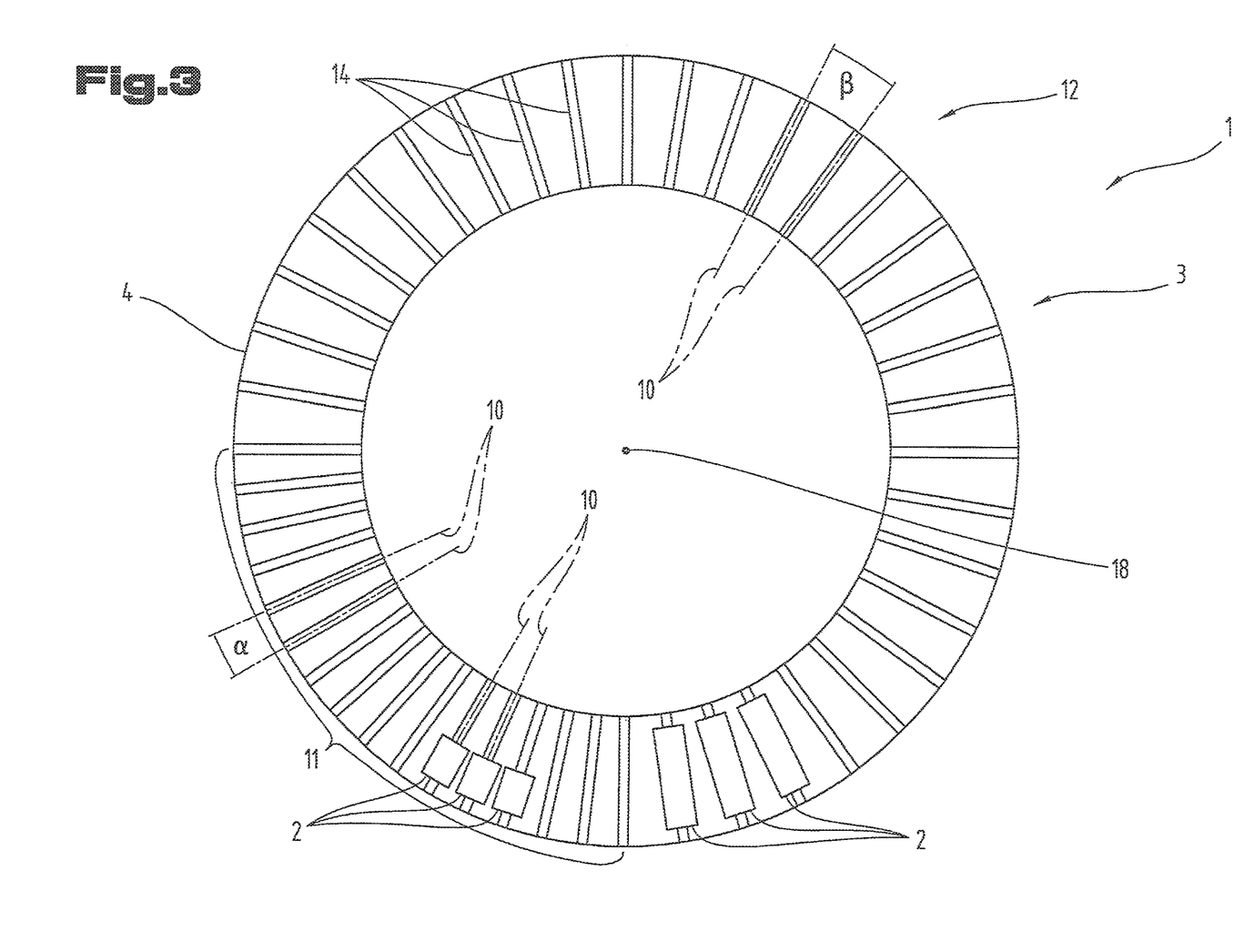
FIG. 3 shows a tool storage with sections of different angular distance between adjacent guide rails.

FIG. 3 shows a storage device 1 which achieves the object of the invention independently of the embodiment of FIGS. 1 and 2 and independently of the number of tool storages. The storage unit 3 therefore comprises an outer tool storage 4, 6, which is ring-shaped or partial-ring-shaped and has a plurality of guide rails 14, 15 running in a radial direction for holding and guiding bending tools 2. The at least one tool storage has along its circumference a first section 11 in which the angular distance between adjacent guide rails 14, 15 is less than in a second section 12 along its circumference.

Expressed another way, the bending tool storage 4 has a first section 11 in which the angular distances α between adjacent guide rails 14 are in each case no greater than a first angle, and a second section 12, in which the angular distances β between adjacent guide rails 14 are in each case at least as great as a second angle, wherein the second angle is greater than the first angle. In the embodiment shown, the angular distances in the respective sections 11, 12 are substantially constant. That is to say, in the first section 11, the angular distances α between adjacent guide rails 14 are in each case as great as the first angle and, in the second section 12, the angular distances β between adjacent guide rails 14 are in each case as great as the second angle.

In a preferred embodiment, the second angle can be at least 1.3 times, preferably at least 1.5 times, particularly preferably at least 2 times as great as the first angle. The bending tool storage 4 from FIG. 3 is ring-shaped but, in an alternative embodiment, could also be partial-ring-shaped or disc-shaped.

It is preferred when the first section 11 and the second section 12 extend over an angular range of at least 30°, preferably at least 60°, particularly preferably at least 90°, along the circumference of the bending tool storage 4. It is also preferred when the first section 11 and the second section 12 comprise at least 3, preferably at least 5, particularly preferably at least 10 guide rails 14.

From FIG. 3, it can be seen that shorter bending tools 2 are held in guide rails 14 of the first section 11 than in guide rails 14 of the second section 12, wherein the bending tools 2 in the guide rails 14 of the first section 11 are closer to the outer ends of the guide rails 14—referred to the radial direction—than to the inner ends. In FIG. 3, they are arranged in the region of the outer ends of the guide rails 14.

It can likewise be seen from FIG. 3 that, in the first section 11, the distance between the longitudinal axes 10 of adjacent guide rails 14 in the region of their inner ends—referred to the radial direction—is no greater than (preferably less than) the dimension of a bending tool 2 held in a guide rail 14 of the first section 11 perpendicular to the direction of the guide rail 14.

Shorter bending tools 2 can be held in the guide rails of the first section 11 than in the guide rails of the second section 12.

Figure 7:
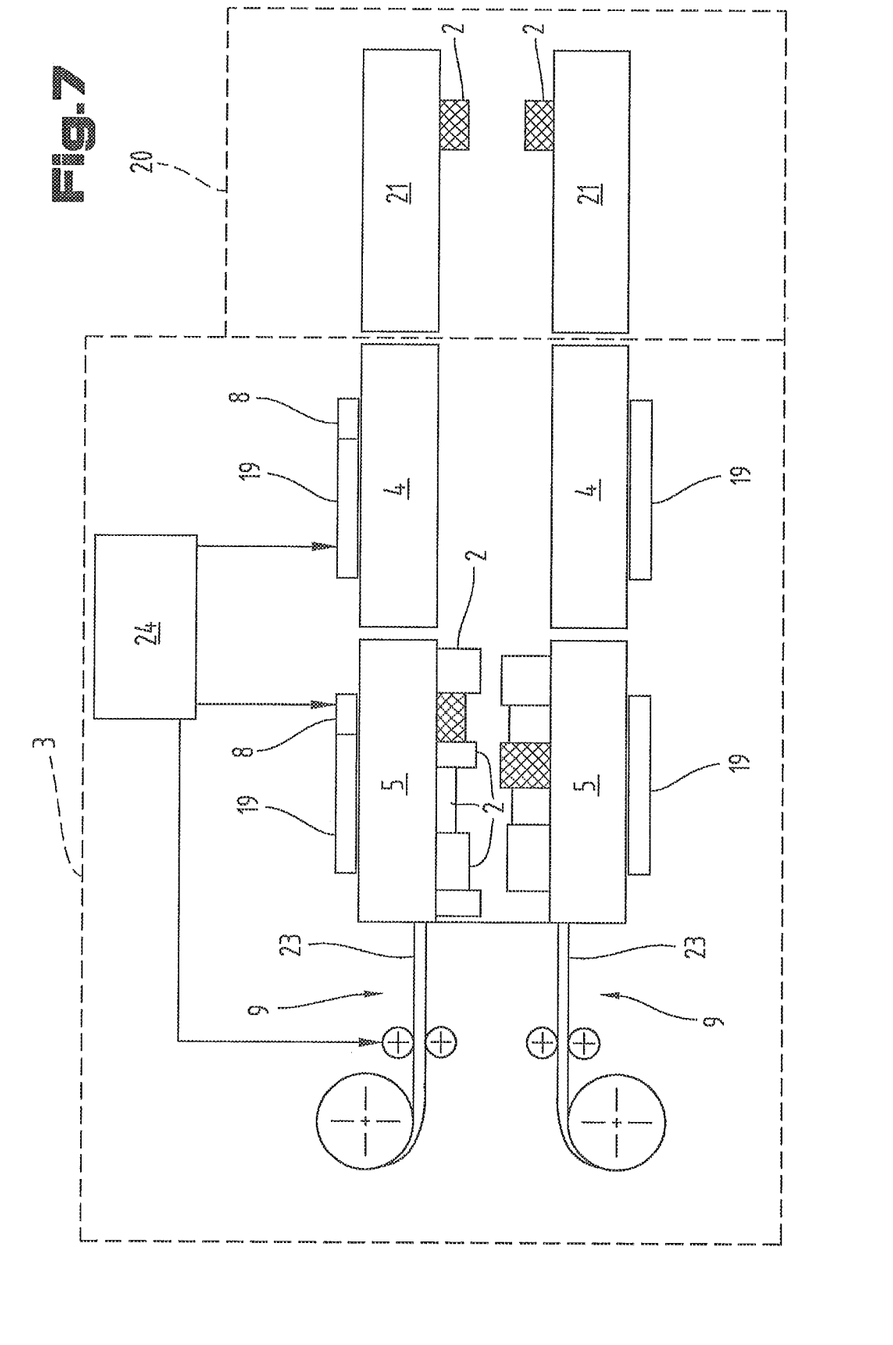
FIG. 7 shows an arrangement of bending press and loading device.

FIG. 7 shows that the outer tool storage 4 and the inner tool storage 5 of the storage unit 3 each have their own rotary drive 19. Like the drive for the transfer device, these are controlled by a control device 24.

In an alternative embodiment, at least two tool storages of the storage unit 3 can have a common rotary drive, from which they can be individually decoupled (by means of a coupling, e.g., a coupling ring).

The storage unit 3 preferably comprises at least one sensor 8 (see FIG. 7), in particular an angle sensor, for determining the rotational position of the outer tool storage 4 and/or the at least one inner tool storage 5.

Figure 5:
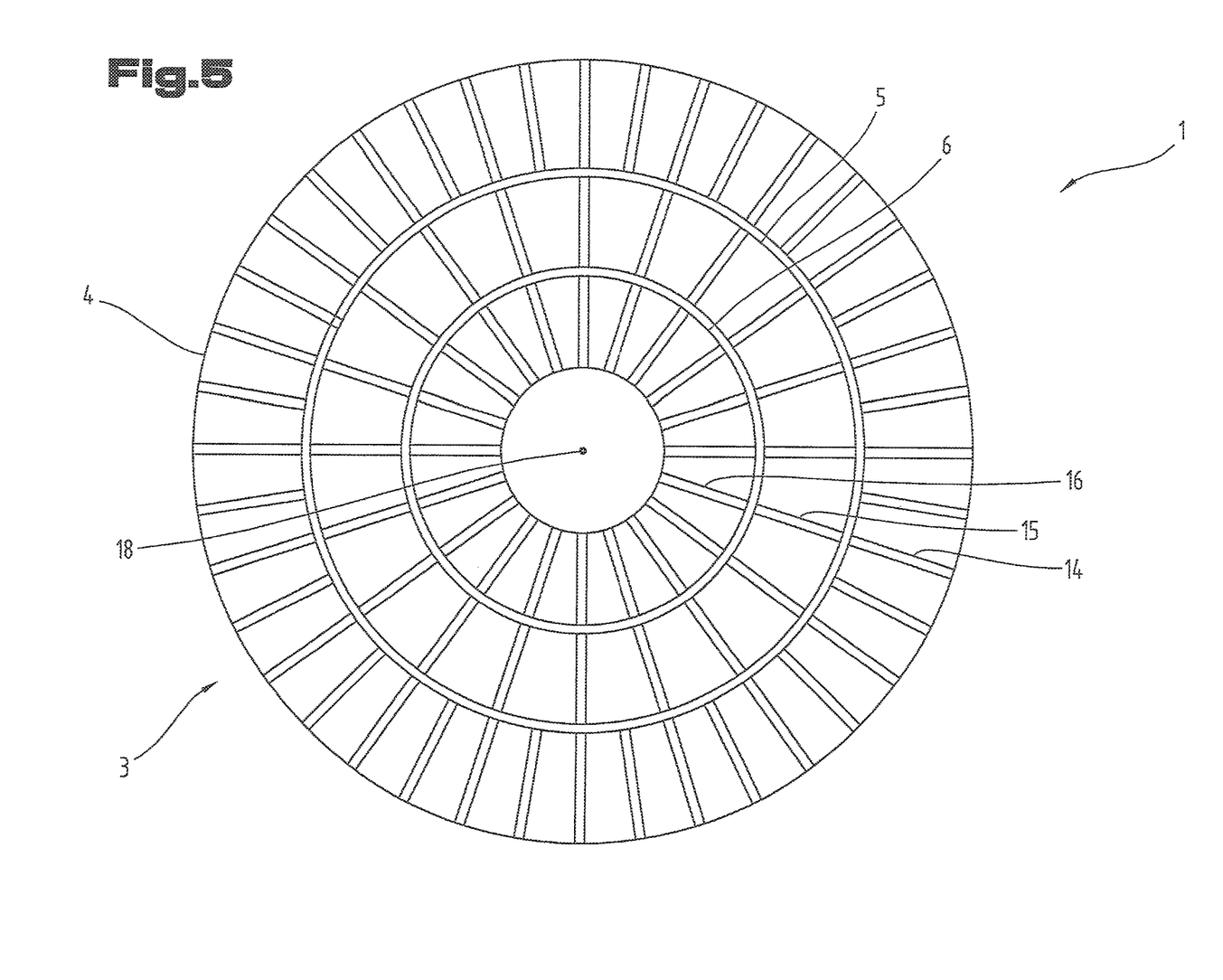
FIG. 5 shows an embodiment with three tool storages.

FIG. 5 shows a storage device 1 in which the storage unit 3 comprises at least two inner tool storages 5, 6 which are rotatable relative to one another.

Figure 4:
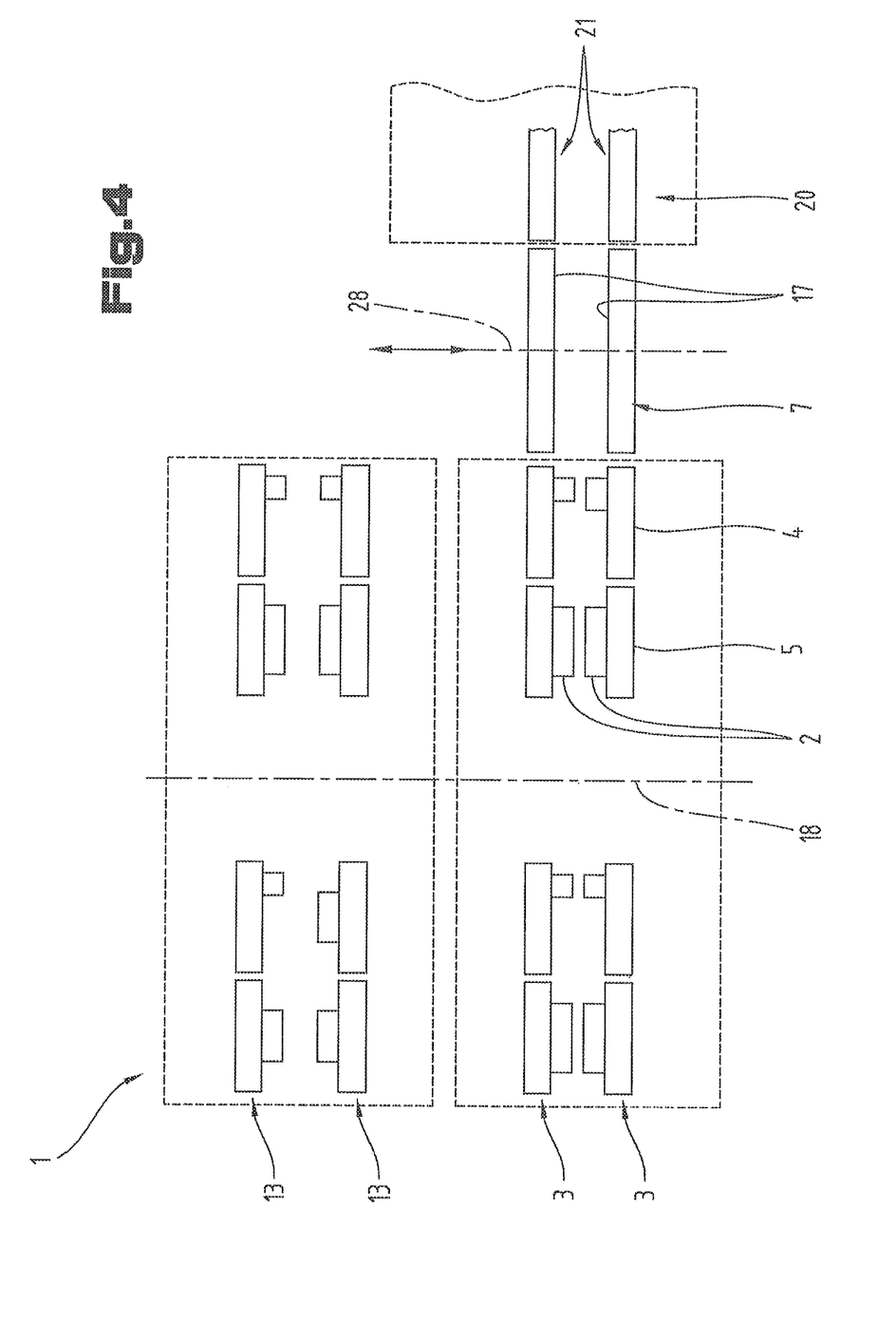
FIG. 4 shows a storage device with a plurality of storage units.

FIG. 4 shows an embodiment with a plurality of storage units 3, 13 which are arranged above one another and (here also) concentrically with one another.

The guide rails of the tool storages of a first storage unit and the guide rails of the tool storages of a second storage unit face one another (see bottom part and top part of FIG. 4).

A intermediate store 7, which has a guide rail 17 for holding and guiding bending tools 2, can also be seen. The intermediate store 7 can be moved between the storage units 3, 13 (here: along the double arrow). It is preferred when the intermediate store 7 is also rotatable about an axis of rotation 28. As a result, the orientation of a bending tool or a series of successively arranged bending tools can be changed (by 180°). The combination of bending tools and the loading of the bending press are extended by a further option as a result.

The object—shown in the left-hand part of FIG. 7—constitutes a loading device, in particular a changing device, for loading a bending press 20 with bending tools 2 and/or for changing one or more bending tools 2 inserted in a bending press 20. The tool holders 21 of the bending press are simultaneously guide rails, along which the bending tools are moved to their required position.

With the storage device according to the invention, a method for depositing at least one bending tool 2 in a storage device 1 and/or for taking at least one bending tool 2 from a storage device 1 can now be carried out. In doing so, the at least one bending tool 2 is moved along guide rails 14, 15, 16 of the tool storages 4, 5, 6.

The method is carried out with a shunting operation in which at least one bending tool 2 is moved from a guide rail 14, 15 of the one tool storage 4, 5 into a guide rail 15, 14 of the other tool storage 5, 4 (FIG. 2) and in which the one tool storage 4, 5 and the other tool storage 5, 4 are rotated relative to one another.

As can be seen from FIG. 2, it is preferred when shorter bending tools 2 are deposited in the guide rails 14 of the outer tool storage 4 than in the guide rails 15 of the inner tool storage 5.

With a storage device 1 according to FIG. 3, it is preferred when shorter bending tools 2 are deposited in the guide rails of the first section 11 than in the guide rails the second section 12.

Figure 8:
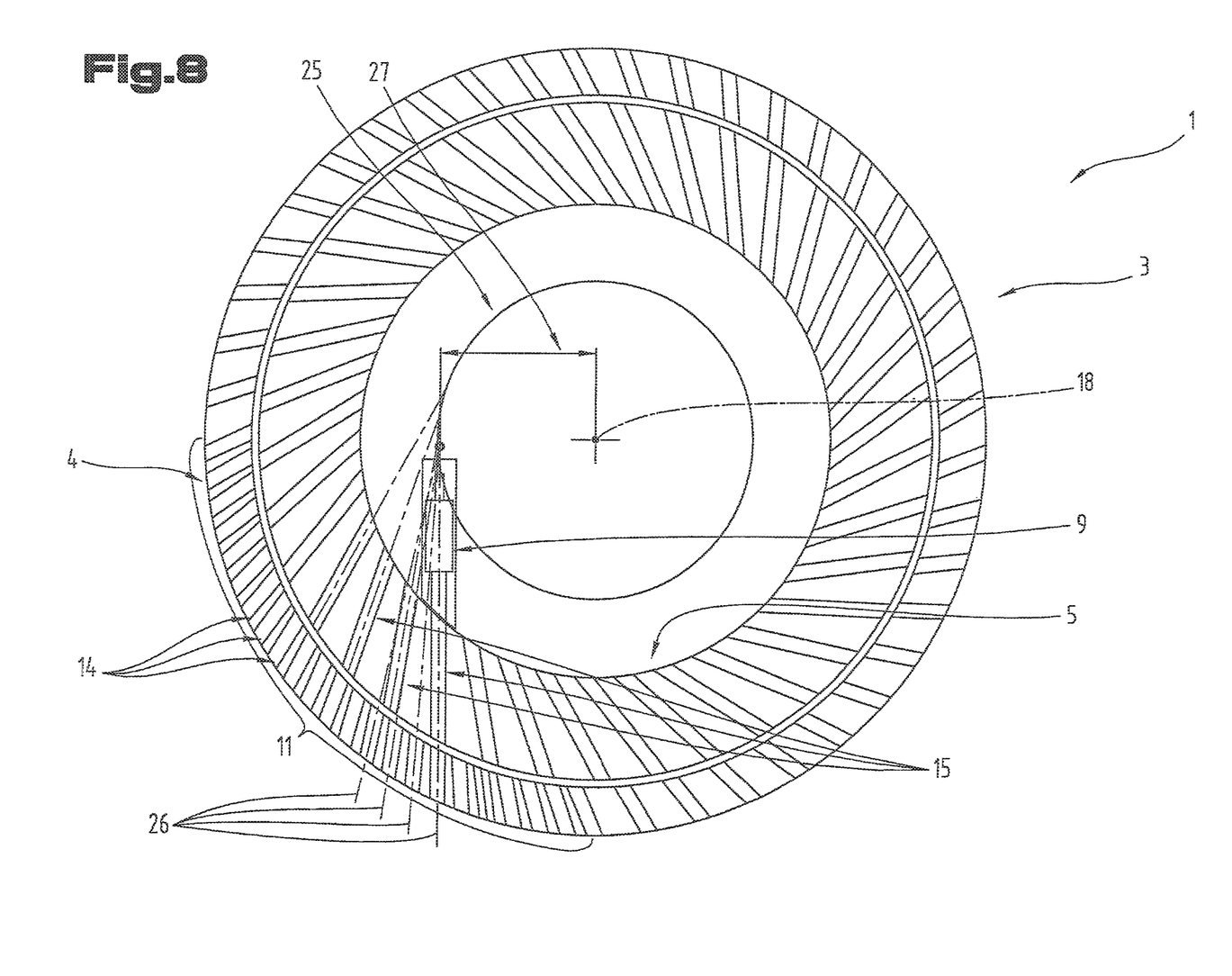
FIG. 8 shows an embodiment with guide rails, the mining direction of which has a tangential component.

FIG. 8 shows an alternative embodiment of a bending tool storage device 1 for storing bending tools 2. A storage unit 3 of the bending tool storage device 1 comprises an outer tool storage 4 and an inner tool storage 5 which have a plurality of guide rails 14, 15. The tool storages 4, 5 can be ring-shaped (alternatively: partial-ring-shaped). The guide rails 14, 15 run in directions 26 which—referred to the ring shape or partial-ring shape of the respective tool storage— have a tangential component. In this exemplary embodiment, the guide rails 14, 15 also run from the inside to the outside or from the inner circumference to the outer circumference of the tool storage. They therefore also have a radial component—referred to the ring shape or partial-ring shape of the respective tool storage—(in addition to the tangential component). Referred to an (imaginary) circular circumference 25, which is concentric with the outer tool storage 4 and the inner tool storage 5, the guide rails run (purely) tangentially. The imaginary circular circumference 25 is smaller than the inside diameter of the inner tool storage 5. In this embodiment, the transfer device 9 has a spacing 27 (offset) from the center or the axis of rotation 18. Here, the spacing 27 corresponds substantially to the radius of the (imaginary) circle with the circular circumference 25. This variant of the bending tool storage device 1 has an asymmetrical design, as a result of which the loading, in particular on the front of the bending press 20, can be reduced.

All embodiments which are shown in FIG. 1-7 can of course also be realized with guide rails, the running directions of which—as shown by way of example in FIG. 8—have a tangential component.

LIST OF REFERENCES

1 Bending tool storage device
2 Bending tool
3 Storage unit
4 Outer tool storage
5 Inner tool storage
6 Inner tool storage
7 Intermediate store
8 Sensor
9 Transfer device
10 Longitudinal axis
11 First section
12 Second section
13 Storage unit
14 Guide rail
15 Guide rail
16 Guide rail
17 Guide rail
18 Axis of rotation
19 Drive
20 Bending press
21 Tool holder
22 Shuttle
23 Tension and/or compression transmission means
24 Controller
25 Circular circumference
26 Direction with tangential component
27 Spacing
28 Axis of rotation
α Angular distance
β Angular distance

The invention claimed is:

1. A bending tool storage device (1) for storing bending tools (2), comprising at least one storage unit (3), which comprises an outer tool storage (4) which is ring-shaped or partial ring-shaped and has a plurality of guide rails (14) for holding and guiding bending tools (2), wherein the storage unit (3) comprises at least one inner tool storage (5, 6) which is arranged inside the outer tool storage (4) and has a plurality of guide rails (15, 16) for holding and guiding bending tools (2), and wherein the outer tool storage (4) and the inner tool storage (5, 6) are rotatable relative to one another, wherein, in different positions of relative rotation between outer tool storage (4) and inner tool storage (5), at least one guide rail (14) of the outer tool storage (4) is in each case in aligned orientation with another guide rail (15, 16) of the inner tool storage (5, 6).

2. The storage device according to claim 1, wherein the at least one inner tool storage (5, 6) is ring-shaped or partial-ring-shaped.

3. The storage device according to claim 1, wherein the at least one inner tool storage (5, 6) is arranged concentrically with the outer tool storage (4).

4. The storage device according to claim 1, wherein the inside diameter of the outer tool storage (4) corresponds substantially to the outside diameter of the inner tool storage (5).

5. The storage device according to claim 1, wherein the guide rails (14) of the outer tool storage (4) and the guide rails (15, 16) of the at least one inner tool storage (5, 6) run in a radial direction or in a direction with radial component.

6. The storage device according to claim 1, wherein the guide rails (14) of the outer tool storage (4) and the guide rails (15, 16) of the at least one inner tool storage (5, 6) each run in directions with tangential component.

7. The storage device according to claim 1, wherein the outer tool storage (4) and the inner tool storage (5) each form a closed ring and wherein the number of guide rails (14) of the outer tool storage (4) is greater than the number of guide rails (15) of the inner tool storage (5).

8. The storage device according to claim 1, wherein the angular distance between adjacent guide rails (14) of the outer tool storage (4) is less than the angular distance between adjacent guide rails (15) of the inner tool storage (5).

9. The storage device according to claim 1, wherein, in the outer tool storage (4), the angular distances between adjacent guide rails (14) are in each case no greater than a first angle and, in the inner tool storage (5), the angular distances between adjacent guide rails (15) are in each case at least as great as a second angle, wherein the second angle is greater than the first angle.

10. The storage device according to claim 9, wherein the second angle is at least 1.3 times as great as the first angle.

11. The storage device according to claim 1, wherein shorter bending tools (2) are held in the guide rails (14) of the outer tool storage (4) than in the guide rails (15) of the inner tool storage (5).

12. The storage device according to claim 1, wherein the outer tool storage (4) and the at least one inner tool storage (5) are rotatable.

13. The storage device according to claim 12, wherein the outer tool storage (4) and the inner tool storage (5) of the storage unit (3) each have their own rotary drive (19).

14. The storage device according to claim 12, wherein at least two tool storages (4, 5, 6) of the storage unit (3) have a common rotary drive (19), from which they can be individually decoupled.

15. The storage device according to claim 1, wherein the storage unit (3) comprises at least one sensor (8), an angle sensor, for determining the rotational position of the outer tool storage (4) and/or the at least one inner tool storage (5).

16. The storage device according to claim 1, wherein a transfer device (9) for moving the bending tools (2) along the guide rails (14, 15) is arranged inside the inner tool storage (5).

17. The storage device according to claim 1, wherein the storage unit (3) comprises at least two inner tool storages (5, 6) which are rotatable relative to one another.

18. The storage device according to claim 1, wherein at least one tool storage (4, 5, 6) has along its circumference a first section (11), in which the angular distance between adjacent guide rails (14, 15, 16) is less than in a second section (12) along its circumference.

19. The storage device according to claim 18, wherein, in the first section (11), the angular distances between adjacent guide rails (14, 15, 16) are in each case no greater than a first angle and wherein, in the second section (12), the angular distances between adjacent guide rails (14, 15, 16) are in each case at least as great as a second angle, wherein the second angle is greater than the first angle.

20. The bending tool storage device according to claim 19, wherein, in the first section (11), the angular distances between adjacent guide rails (14, 15, 16) are in each case as great as the first angle and/or wherein, in the second section (12), the angular distances between adjacent guide rails (14, 15, 16) are in each case as great as the second angle.

21. The bending tool storage according to claim 19, wherein the second angle is at least 1.3 times as great as the first angle.

22. The storage device according to claim 18, wherein shorter bending tools (2) are held in the guide rails of the first section (11) than in the guide rails of the second section (12).

23. The storage device according to claim 1, wherein the storage device (1) has at least two storage units (3, 13) which are arranged above one another.

24. The storage device according to claim 23, wherein the guide rails of the tool storages of a first storage unit (3) and the guide rails of the tool storages of a second storage unit (13) face one another.

25. The storage device according to claim 23, wherein the storage device (1) comprises at least one intermediate store (7) which has at least one guide rail (17) for holding and guiding bending tools (2), wherein the intermediate store (7) can be moved between the storage units (3, 13).

26. A loading device, in particular a changing device, for loading a bending press (20) with bending tools (2) and/or for changing one or more bending tools (2) inserted in a bending press (20), comprising a storage device (1) according to claim 1.

27. A method for depositing at least one bending tool (2) in a storage device (1) and/or for taking at least one bending tool (2) from a storage device (1), wherein the storage device (1) is designed according to claim 18 and wherein the at least one bending tool (2) is moved along guide rails (14, 15, 16) of the tool storages (4, 5, 6).

28. The method according to claim 27, wherein the method comprises at least one shunting operation in which at least one bending tool (2) is moved from a guide rail (14, 15) of the one tool storage (4, 5) into a guide rail (15, 14) of the other tool storage (5, 4), and in which the one tool storage (4, 5) and the other tool storage (5, 4) are rotated relative to one another.

29. The method according to claim 27, wherein shorter bending tools (2) are deposited in the guide rails (14) of the outer tool storage (4) than in the guide rails (15) of the inner tool storage (5).

30. The method according to claim 27, wherein shorter bending tools (2) are deposited in the guide rails of the first section (11) than in the guide rails of the second section (12).

* * * * *